United States Patent [19]
Robinson

[11] Patent Number: 5,829,796
[45] Date of Patent: Nov. 3, 1998

[54] PROTECTION OF SEALING SURFACES OF METAL FACE SEALS IN TUBING FITTINGS

[76] Inventor: Eric R. Robinson, 546 Division St., Campbell, Calif. 95008

[21] Appl. No.: 816,109

[22] Filed: Mar. 11, 1997

[51] Int. Cl.⁶ .................................................. F16L 13/02
[52] U.S. Cl. ...................... 285/288.1; 285/328; 285/330; 285/353; 285/379
[58] Field of Search ............................. 285/24, 27, 328, 285/353, 288.1, 913, 354, 379, 330

[56] References Cited

U.S. PATENT DOCUMENTS

| | | | |
|---|---|---|---|
| 4,363,337 | 12/1982 | Pease | 285/330 X |
| 5,054,822 | 10/1991 | McGushion . | |
| 5,066,051 | 11/1991 | Weigl | 285/330 X |
| 5,145,219 | 9/1992 | Babuder | 285/330 |
| 5,163,721 | 11/1992 | Babuder | 285/330 X |
| 5,306,052 | 4/1994 | McGushion . | |
| 5,308,124 | 5/1994 | Yamaji et al. | 285/328 |
| 5,366,261 | 11/1994 | Ohmi et al. | 285/328 |
| 5,673,946 | 10/1997 | Barber | 285/328 |

*Primary Examiner*—Dave W. Arola
*Attorney, Agent, or Firm*—Donald D. Mon

[57] ABSTRACT

A fitting includes two glands, each of which has a head with an attached tubing segment having a passage opening through a face on the respective head. A peripheral sealing bead on each head is normal to the axis of the head. Compression means draws the beads toward one another to press them against an intervening gasket to make a seal. A torque suppressor is rigidly mounted to each head, having a tongue with an axially extending complementary edge to contact a tongue on the other torque suppressor to prevent relative rotation of the heads while the compression means is being tightened. Optionally the lengths of the torque suppressor are such as to prevent abutment of the beads unless a gasket is placed between them.

10 Claims, 3 Drawing Sheets

PROTECTION OF SEALING SURFACES OF METAL FACE SEALS IN TUBING FITTINGS

FIELD OF THE INVENTION

The protection of the finely-finished metal sealing surfaces which are compressively tightened against a metal gasket in tubing fittings.

BACKGROUND OF THE INVENTION

Metal face seals are used in fittings which join two tubings. Such fittings and seals are usually intended to carry highly pure gases, highly toxic or corrosive gases, and pyrophoric gases. A major market for these fittings is in the semiconductor processing field, where extreme purity and absolute certainty against leakage are required. Admission of foreign gases through a leaky union can result in very expensive product scrappage, and downtime for clean up and repair of equipment. Leakage of the gases past the union can result in severe injury to personnel and equipment.

Accordingly, the metal-to-metal seals that are required for these applications use highly polished, very smooth and accurate sealing surfaces. Any metal to metal sliding movement across or along these seals risks scratching or otherwise deforming their surfaces, thereby creating a risk of ultimate leakage and costly replacement of the fitting. Because two of these seals, which face each other, are brought against an intervening metal gasket by tightening two nuts, one male and one female against the glands which bear these seals, there is the risk of relative rotation which can damage the seal surfaces.

This is not a new problem, and previous proposals have been made to solve it. A recent proposal is shown in McGushion U.S. Pat. No. 5,054,822, in which a thrust washer is placed between the nut and a shoulder on one of the heads carrying a seal. A tongue on the thrust washer extends axially to engage in an axial slot in the thread of the male nut. The friction between the thrust washer and the seal is intended to hold the thrust washer against rotation even while the nut is being turned. Thus, the two seals are intended to be held against relative rotation.

While successful for its intended purpose, the McGushion thrust washer is a loose element which can rotate, because its resistance to rotation is a function of the characteristics of the abutting surfaces, which can vary. Also, its use on fittings which are permanently attached to gas cylinders can be clumsy.

It is an object of this invention to provide torque-resistant means permanently affixed to each part of the fitting, thereby not requiring modification of the thread by forming an axial groove in the thread.

Another problem inherent in the use of known metal face seals is the risk that the installer may thoughtlessly fail to place a gasket between the sealing surfaces, or cause the seals to shear through the gasket. Then, when the sealing surfaces are brought toward each other they may make direct contact with one another, which can damage the surfaces, and for all purposes destroy the fitting. Furthermore, the fitting will leak unless the omission is detected. Replacement of these fittings is a very expensive procedure.

It is an object of this invention to provide means to limit the approach of the sealing surfaces toward each other so they cannot contact one another if the gasket is omitted.

BRIEF DESCRIPTION OF THE INVENTION

Both of two tubing segments to be joined by a fitting according to this invention carry a gland at one of its ends. Each gland includes a head with a peripheral seal in the form of a bead. The beads lie in a plane normal to the central axis of the fitting. Each gland has an external shoulder to be abutted by a threaded nut. The nuts are tightened together to draw the beads toward each other and against an intervening gasket to complete the seal.

According to one feature of this invention, a torque suppressor is attached to each gland, each suppressor having an axially-extending tongue so proportioned and arranged as to engage a tongue on the other suppressor to prevent relative rotation of the suppressors, and thereby to prevent relative rotation of the tubing segments and their glands. In addition, this prevents relative distortion of components attached to the fitting, because no torque will be exerted on them.

According to this invention, the torque suppressors may be attached to the glands by a tight interference fit, or by welding.

According to yet another feature of the invention, the axial lengths of the tongues are such that in the event a gasket is omitted, at least one of the tongues will abut the opposite gland before the beads can contact one another, thereby preventing destructive contact.

According to yet another optional feature of the invention, the torque suppressor retains the gasket.

The above and other features of this invention will be fully understood from the following detailed description and the accompanying drawing, in which:

DETAILED DESCRIPTION OF THE INVENTION

Figure 1:
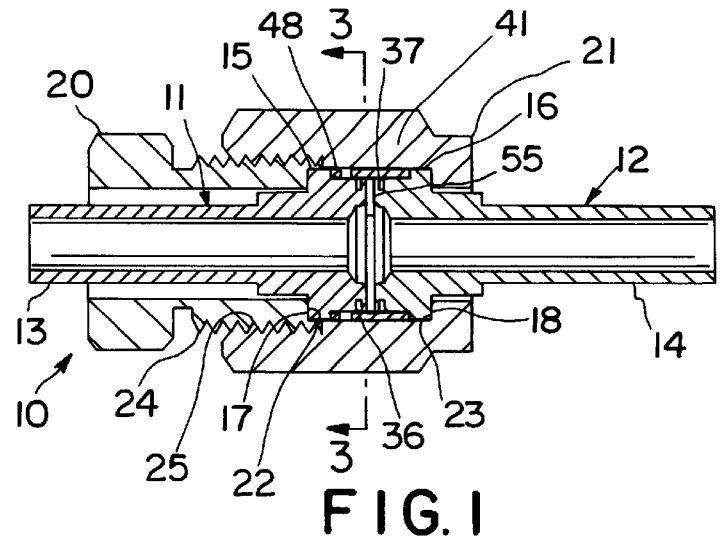
FIG. 1 is an axial cross-section of the presently-preferred embodiment of the invention taken at line 1—1 in FIG. 3.

The presently-preferred embodiment of a fitting 10 according to the invention is shown in FIG. 1. It includes glands 11, 12, which include respective tubing segments 13, 14. A head 15, 16 on each gland includes an abutment shoulder 17, 18 facing the direction of the tubing segments. The tubing segments will be welded to system tubing to complete a gas line.

Assembly nuts 20, 21 one male and one female, are respectively fitted over tubing segments 13, 14, and include shoulders 22, 23 which are to be brought against shoulders 17 and 18 when threads 24 and 25 are tightened down.

Seals are formed with peripheral beads 36, 37 around the openings of the tubing segments through the respective heads. They are precisely normal to the axis of the fittings, and face toward each other.

Figure 2:
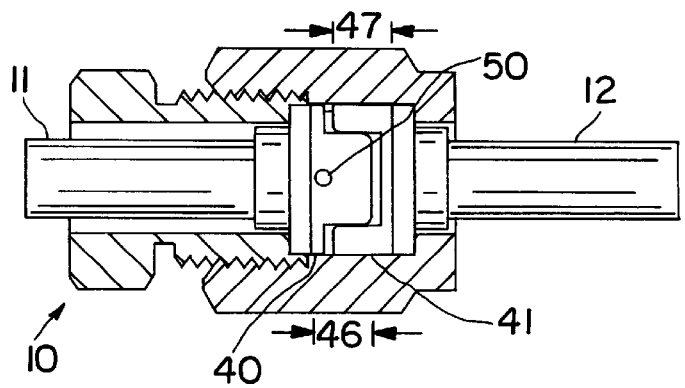
FIG. 2 is an axial cross-section taken at line 2—2 in FIG. 3.
Figure 3:
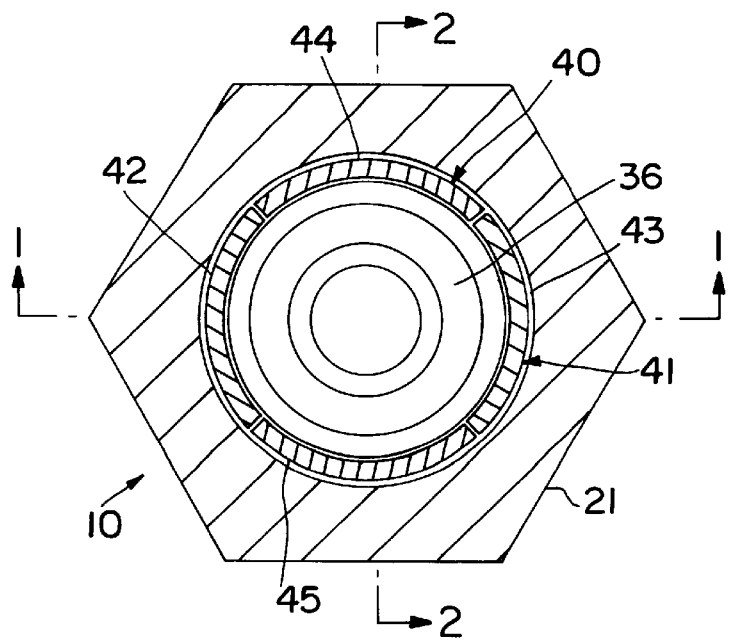
FIG. 3 is a cross-section taken at line 3—3 in FIG. 1.

Torque suppressors 40, 41 are formed on respective heads 15 and 16. These suppressors are formed in pairs of curvilinear tongues 42, 43, and 44, 45. As best shown in FIG. 2, their inside surfaces are fragments of axial cylinders. When assembled with the respective heads, they have an axial length 46, 47 respectively. The tongues extend from a base 48 which surrounds and embraces the gland. It is desirable for the torque suppressors to be attached to the glands so they will remain in place. This is especially useful when the fitting is part of a permanent attachment, such as to a gas cylinder valve.

It is both positive and practical to attach the torque suppressors to the heads with an interference fit. This arrangement is within the scope of the invention. However, a more positive retention will often be preferred. One example is shown in FIG. 2, wherein a spot weld 50 has been made between the torque suppressor and its respective head. Neither the suppressors nor the heads will be distorted by a carefully made spot weld.

Figure 6:
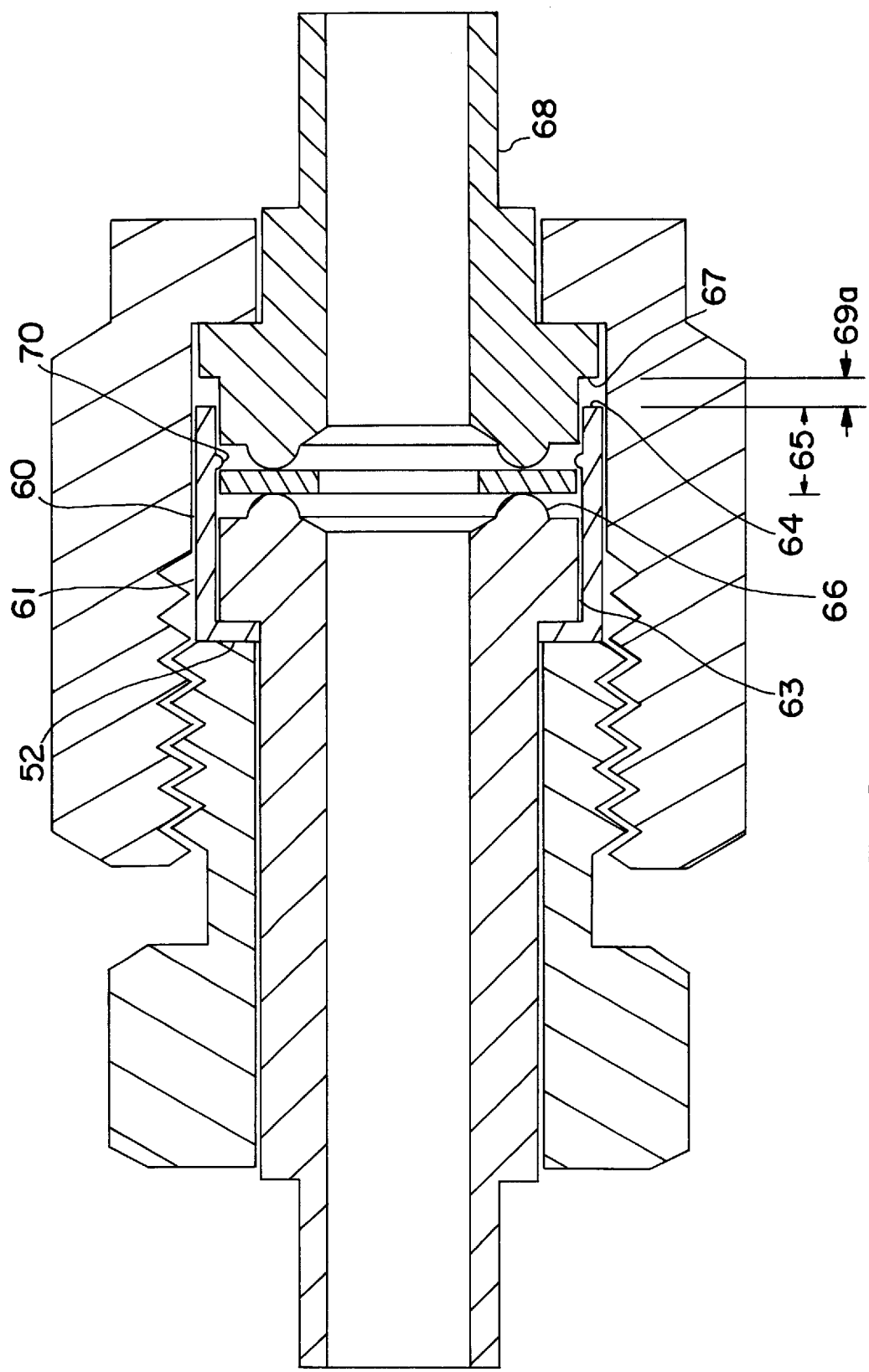
FIG. 6 an axial cross-section of another embodiment of the invention.

Another means to retain a torque suppressor is shown in FIG. 6. Although it is shown on a spacer, rather than on a torque suppressor, its inwardly-directed flange 52 can provide at least partial restraint, in the presence of a respective nut.

A gasket 55 is placed between the beads for sealing purposes. It is made of metal such as nickel, nickel-plated stainless steel, or stainless steel, which is somewhat softer than the material of the beads, which is usually of a hard stainless steel such as 316 stainless. Thus, compression of the fitting will result in some very minor deformation of the gasket, enough to assure a full seal, provided that the bead has not previously been scratched or deformed.

Figure 4:
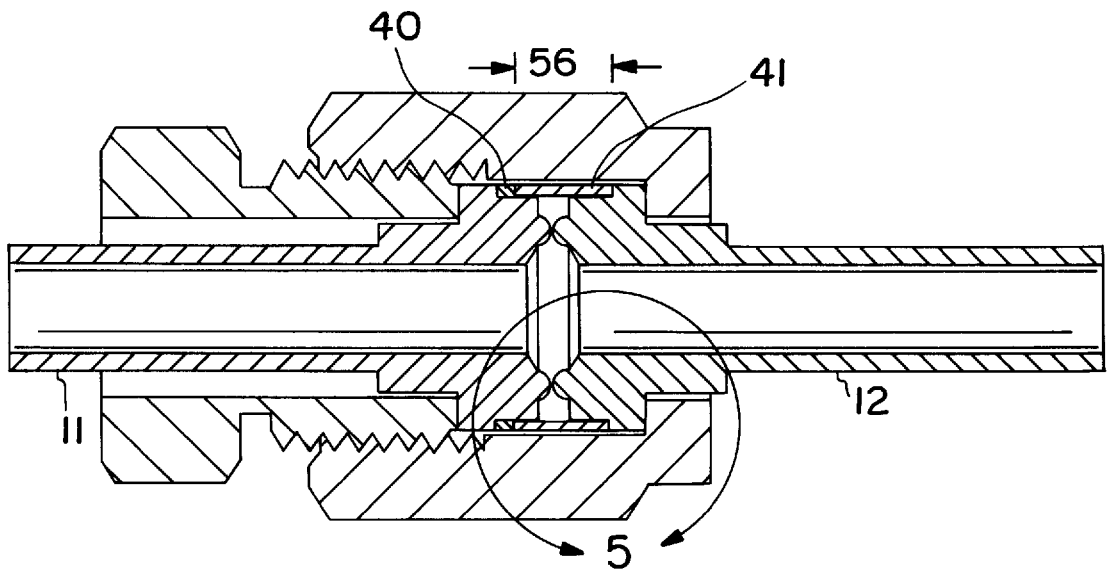
FIG. 4 is an axial cross-section of the fitting of FIG. 1, incorporating an optional feature.
Figure 5:
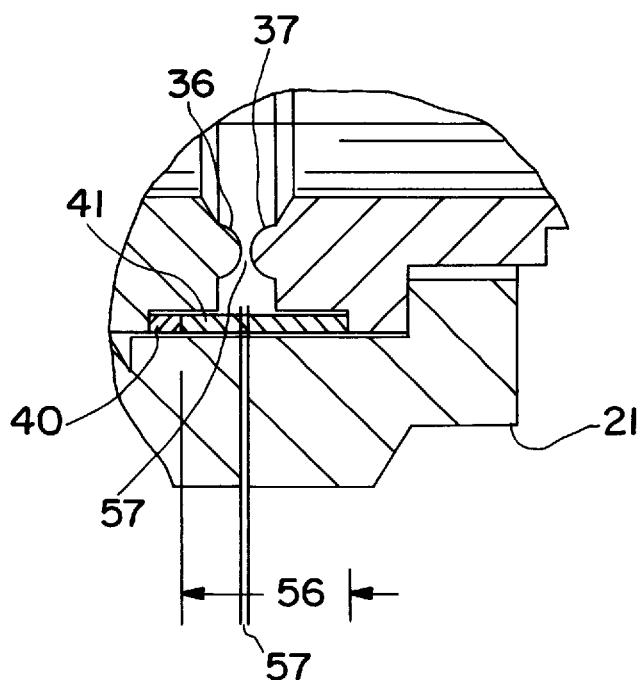
FIG. 5 is an enlarged view of region 5 in FIG. 4.

A useful optional feature of the invention is best shown in FIGS. 4 and 5 which show the fitting improperly assembled without a gasket. The lengths 56 of the torque suppressors are such that they do not strike the opposite head when the gasket is in place (FIG. 1). At least one of them is long enough to strike the opposite head before the beads contact each other when the gasket is not present, leaving a protective spacing 57 between the beads (FIG. 5).

This is an important feature, because if the beads do bear against one another, the glands must be replaced. This repair on a semi-conductor process tool, which often costs on the order of $1.2 million, must be done in a highly controlled clean room environment. The direct cost of this repair, and the down time of the process, are very costly.

Some advantages, although not all of them, can be attained with the use of only one limiter 60 (FIG. 6). This limiter includes a cylindrical base 61 and an optional inwardly directed flange 52. It may be tightly fitted or spot welded to head 63 if flange 52 is not provided. If torque suppression is not desired, the base extends as a cylinder to an end 64. Its length 65 beyond bead 66 is such that it will strike shoulder 67 on gland 68 before the beads contact one another if gasket 69 is omitted. Notice clearance 69a, which is less than the spacing would be between the beads when they both engage the gasket. This assures that the beads can never be brought against each other. This feature is useful without torque suppression, although it can be provided with torque suppression means as shown in FIGS. 1–5.

FIG. 6 illustrates still another optional feature of this invention. Gasket retention means 70 is formed on the inside of the base, or on part of the base such as on the tongues in embodiments providing torque suppressors.

A convenient form of retention means is a small projection in the inside wall of the base. It should be small enough to pass over the head, and also to pass the gasket, but large enough that the gasket is unlikely to fall out. There are, of course other useful means to keep the gasket, but this is the simplest.

This invention thereby provides several advantages to a fitting which are useful individually, or in any combination, all of which serve as assurance of a reliable gas tight joinder.

When the torque suppressors are specifically and permanently mounted to the glands, then the glands are themselves specifically aligned with one another and will remain so. This can be a significant advantage in many installations.

This invention is not to be limited by the embodiments shown in the drawings and described in the description, which are given by way of example and not of limitation, but only in accordance with the scope of the appended claims.

I claim:

1. In combination, a fitting of the type which includes two glands, each with a head having an attached tubing segment whose passage opens through a face in the respective head, a peripheral sealing bead on each said face, compression means to draw the beads toward one another, and a gasket between said beads against which they are pressed to make a seal, the improvement comprising:

torque suppressor means rigidly mounted to each of said heads, each said torque suppressor comprising an axially extending tongue directed toward the opposite head, each said tongue having an engagement edge which makes an axially extending engagement with a complementary edge on a tongue from the other torque suppressor means, whereby to prevent relative rotation of said heads while the compression means is being tightened.

2. Apparatus according to claim 1 in which said torque suppressor includes a cylindrical base, said tongue extending axially from said base.

3. Apparatus according to claim 2 in which each said base is welded to its respective head.

4. Apparatus according to claim 2 in which each said base includes an inwardly directed flange so disposed and arranged as to prevent said torque suppressor means from being removed from the head by passing over the head.

5. Apparatus according to claim 2 in which retention means is provided in at least one of said tongues to retain said gasket to said torque suppressor means.

6. Apparatus according to claim 2 in which the axial length of at least one tongue is such as to contact the other head before the beads can contact one another in the absence of a gasket between the heads.

7. Apparatus according to claim 6 in which retention means is provided in at least one of said tongues to retain said gasket to said torque suppressor.

8. In combination, a fitting of the type which includes two glands, each with a head with an attached tubing segment whose passage opens through a face in the respective head, a peripheral sealing bead on each said face, compression means to draw the beads toward one another, and a gasket between said beads against which they are pressed to make a seal, the improvement comprising:

spacer means mounted to one of said heads and extending axially toward said other head, said means having an axial dimension such that, in the absence of said gasket, it will contact said other head before said beads can contact one another, thereby to protect said bead from contact with one another.

9. Apparatus according to claim 8 in which said spacer comprises a tongue extending from a cylindrical base, said base being retained to its respective head.

10. Apparatus according to claim 8 in which said spacer includes retention means to engage said gasket and prevent it from falling loose from said fitting.

* * * * *